United States Patent
Chou et al.

(10) Patent No.: US 12,282,213 B2
(45) Date of Patent: Apr. 22, 2025

(54) TERAHERTZ MODULATOR AND TERAHERTZ SPATIAL LIGHT MODULATOR

(71) Applicant: NATIONAL TSING HUA UNIVERSITY, Hsinchu (TW)

(72) Inventors: Ho-Hsiu Chou, Hsinchu (TW); Shang-Hua Yang, Hsinchu (TW); Chia-Ming Mai, Hsinchu (TW); Mohamed Hammad Elsayed, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 670 days.

(21) Appl. No.: 17/583,217

(22) Filed: Jan. 25, 2022

(65) Prior Publication Data

US 2023/0060516 A1 Mar. 2, 2023

(30) Foreign Application Priority Data

Aug. 27, 2021 (TW) ................................ 110131944

(51) Int. Cl.
*G02F 1/01* (2006.01)
*G01N 21/3581* (2014.01)

(52) U.S. Cl.
CPC ....... *G02F 1/0126* (2013.01); *G01N 21/3581* (2013.01); *G02F 2203/13* (2013.01)

(58) Field of Classification Search
CPC .............. G02F 1/0126; G02F 2203/13; G01N 21/3581
See application file for complete search history.

(56) References Cited

U.S. PATENT DOCUMENTS

| 2008/0099698 A1* | 5/2008 | Rahman | H01S 1/02 250/493.1 |
| 2008/0315216 A1* | 12/2008 | Otsuji | H01L 31/09 257/E33.001 |

(Continued)

FOREIGN PATENT DOCUMENTS

| CN | 111298824 A | 6/2020 |
| CN | 111517306 A | 8/2020 |

(Continued)

OTHER PUBLICATIONS

Memon et al. "A simulation study of terahertz dielectric resonator using graphitic carbon nitride", 2018 22nd International Microwave and Radar Conference (MIKON), Poznan, Poland, 2018, pp. 722-725, doi: 10.23919/MIKON.2018.8405337 (Year: 2018).*

(Continued)

*Primary Examiner* — Hugh Maupin
(74) *Attorney, Agent, or Firm* — CKC & Partners Co., LLC (57) ABSTRACT

A terahertz modulator includes a substrate and an organic semiconductor layer. A material of the organic semiconductor layer is graphitic carbon nitride, and the organic semiconductor layer is coated on a surface of the substrate. The terahertz modulator has a high on-off contrast and is able to reach a high modulation speed. A terahertz spatial light modulator includes a terahertz modulator and an automatic pumped light spatial modulator. The automatic pumped light spatial modulator is optically connected with the terahertz modulator. The terahertz spatial light modulator generates a patterned terahertz light, and the terahertz spatial light modulator has a high on-off contrast and is able to reach a high modulation speed.

10 Claims, 6 Drawing Sheets

(56) References Cited

U.S. PATENT DOCUMENTS

| | | | | |
|---|---|---|---|---|
| 2009/0206263 | A1* | 8/2009 | Rahman | G02F 1/3558 |
| | | | | 250/341.1 |
| 2014/0001379 | A1 | 1/2014 | Kee et al. | |
| 2014/0319385 | A1* | 10/2014 | Mikhailov | H10D 62/882 |
| | | | | 257/29 |
| 2015/0316511 | A1* | 11/2015 | Guo | H04B 10/27 |
| | | | | 398/140 |
| 2016/0178843 | A1* | 6/2016 | Fujita | H01Q 1/00 |
| | | | | 385/14 |
| 2017/0240422 | A1* | 8/2017 | Cooper | H10K 85/6572 |
| 2018/0364158 | A1* | 12/2018 | Wang | G06V 10/143 |
| 2019/0003998 | A1* | 1/2019 | Ellis | H01L 31/113 |
| 2019/0094461 | A1* | 3/2019 | Kleinert | G02B 6/1221 |
| 2020/0152679 | A1* | 5/2020 | Sato | H01L 31/028 |
| 2021/0026221 | A1* | 1/2021 | Kaji | G02F 1/361 |

FOREIGN PATENT DOCUMENTS

| | | |
|---|---|---|
| CN | 111740076 A | 10/2020 |
| TW | 202112442 A | 4/2021 |

OTHER PUBLICATIONS

Chia-Ming Mai et al., "Organic Semiconductors as High-Speed Photoconductive Terahertz Spatial Light Modulators", 2021 46th International Conference on Infrared, Millimeter and Terahertz Waves, dated on Aug. 29, 2021 to Sep. 3, 2021, 2 pages, paper, China, P.R.C.

Ting He et al., "High-efficiency THz modulator based on phthalocyanine-compound organic films", Applied Physics Letters, published on Feb. 5, 2015, vol. 106, issue 5, 5 pages, published by AIP Publishing, United States.

Ting He et al., "High efficiency THz-wave modulators based on conjugated polymer-based organic films", Journal of Physics D: Applied Physics, published on Jan. 28, 2016, vol. 49, No. 7, 8 pages, published by IOP Publishing, United Kingdom.

Zhong-Wei Shi et al., "Terahertz Modulators Based on Silicon Nanotip Array", Advanced Optical Materials, published on Dec. 4, 2017, vol. 6, issue 2, 8 pages, published by Wiley-VCH, Germany.

Yung Keun Yoo et al., "Conditions for optimal efficiency of PCBM-based terahertz modulators", AIP Advances, published on Oct. 12, 2017, vol. 7, issue 10, 6 pages, published by AIP Publishing, United States.

Only-Perception, "Tunable graphene device demonstrated: First tool in kit for putting terahertz light to work", published on Sep. 7, 2011, webpage, accessed at https://pansci.asia/archives/7010, Taiwan, R.O.C.

* cited by examiner

TERAHERTZ MODULATOR AND TERAHERTZ SPATIAL LIGHT MODULATOR

RELATED APPLICATIONS

This application claims priority to Taiwan Application Serial Number 110131944, filed Aug. 27, 2021, which is herein incorporated by reference.

BACKGROUND

Technical Field

The present disclosure relates to a terahertz modulator and a terahertz spatial light modulator. More particularly, the present disclosure relates to a terahertz modulator and a terahertz spatial light modulator made of organic materials and having a high on-off contrast and is able to reach a high modulation speed.

Description of Related Art

Terahertz imaging has been one of the most fruitful and promising research fields surrounding terahertz technology studies. Among numerous methods of terahertz imaging, terahertz single-pixel imaging holds a distinguished position in this field, as it does not require mechanical movements to perform multi-pixel imaging in comparison with other imaging technologies. However, a spatial light modulator for terahertz radiation is required to perform terahertz single-pixel imaging. Therefore, the operation speed of the terahertz spatial light modulator significantly affects the measurement time of an image.

In order to achieve high quality real-time terahertz imaging, an excellent spatial light modulator is required high on-off contrast and be able to be operated between a range of kilo frame per second to mega frame per second. Currently, people prefer photoinduced semiconductors made of inorganic materials as candidates of high speed terahertz spatial light modulators, such as silicon, gallium arsenide (GaAs), germanium, graphene, vanadium(IV) oxide ($VO_2$), patterned metallic apertures, metamaterials and liquid crystal materials, wherein silicon can be applied by doping with gold nanoparticles or in forms of nano-column or nano-pyramid.

Nevertheless, it is very difficult to achieve both high on-off contrast and high modulation speed, since to reach high modulation speed is equivalent to shorten the lifetime of the generated photoelectrons, which hinders the efficiency of electron accumulation, making the material unable to block terahertz power and reach a high terahertz absorbance, and further being favorable to decrease the on-off contrast.

Further, developing a terahertz spatial light modulator having high on-off contrast and high modulation speed is an important part of the development of the terahertz (single-pixel) imaging which can be applied in various fields, such as security screening, quality control and art conservation. Therefore, the development of a terahertz modulator and a terahertz spatial light modulator having high on-off contrast and high modulation speed simultaneously is a valuable objective in various fields.

SUMMARY

According to one aspect of the present disclosure, a terahertz modulator includes a substrate and an organic semiconductor layer. A material of the organic semiconductor layer is graphitic carbon nitride, and the organic semiconductor layer is coated on a surface of the substrate. The terahertz modulator has a high on-off contrast and is able to reach a high modulation speed.

According to another aspect of the present disclosure, a terahertz spatial light modulator includes a terahertz modulator of the aforementioned aspect and an automatic pumped light spatial modulator. The automatic pumped light spatial modulator is optically connected with the terahertz modulator. The terahertz spatial light modulator generates a patterned terahertz light, and the terahertz spatial light modulator has a high on-off contrast and is able to reach a high modulation speed.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
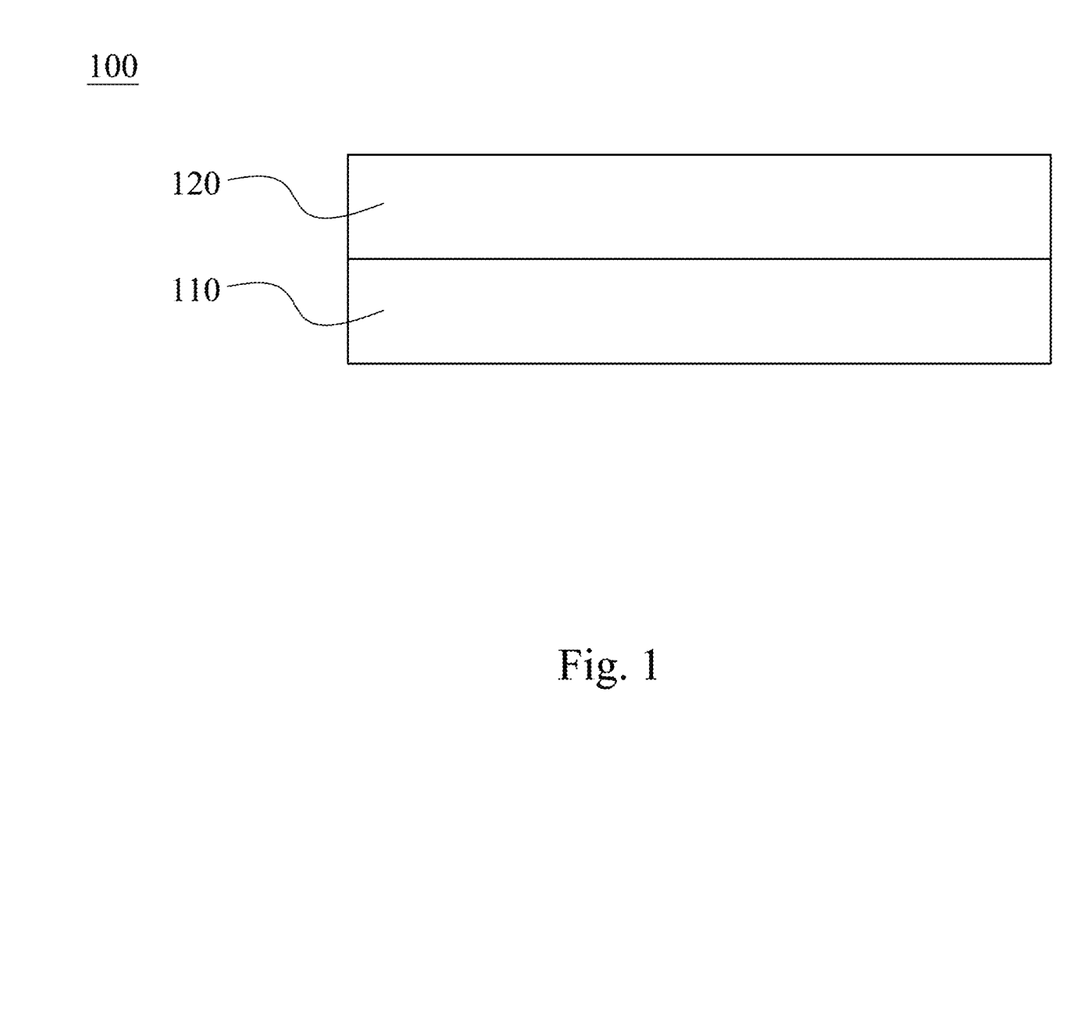
FIG. 1 is a structure schematic view of a terahertz modulator according to one embodiment of the present disclosure.

Please refer to FIG. 1. FIG. 1 is a structure schematic view of a terahertz modulator 100 according to one embodiment of the present disclosure. The terahertz modulator 100 includes a substrate 110 and an organic semiconductor layer 120. A material of the organic semiconductor layer 120 is graphitic carbon nitride (g-$C_3N_4$), and the organic semiconductor layer 120 is coated on a surface of the substrate 110. The terahertz modulator 100 has a high on-off contrast and is able to reach a high modulation speed.

In detail, the organic semiconductor layer 120 can further include a doping element, the doping element can be a boron, a phosphorus, a nitrogen or an oxygen so as to increase the amount of the carrier of the organic semiconductor layer 120 and enhance the electrical properties of the organic semiconductor layer 120, but the present disclosure is not limited thereto.

The organic semiconductor layer 120 can be made of a heterojunction material. The heterojunction material can be made from mixing graphitic carbon nitride with a conjugated polymer. For example, the heterojunction material can be made from mixing graphitic carbon nitride with poly[4-(5-(9,9-dioctyl-9H-fluoren-2-yl)thiophen-2-yl)-5,6-difluoro-2-octyl-7-(thiophen-2-yl)-2H-benzo[d][1,2,3]triazole] (PFTBTA). In detail, the heterojunction material is obtained by dispersing graphitic carbon nitride in chloroform and mixing with chloroform solution containing PFTBTA for 24 hours, but the present disclosure is not limited thereto.

In particular, most of the conventional terahertz modulators are inflexible components due to material limitation. However, the organic semiconductor layer 120 of the terahertz modulator 100 of the present disclosure is flexible, therefore a material of the substrate 110 can also be chosen from flexible materials so as to make the terahertz modulator 100 of the present disclosure also be flexible. Specifically, an inflexible material of the substrate 110 can be glass. On the other hand, a flexible material of the substrate 110 can be polyethylene terephthalate (PET), poly(methyl methacrylate) (PMMA), etc., but the present disclosure is not limited thereto.

The terahertz modulator 100 of the present disclosure should apply with a light source in practical use, wherein the light source emits a pump light to irradiate the terahertz modulator 100 and so as to generate a structured terahertz light. In detail, the form of the light source can be continuous wave, pulse wave or arbitrary wave, and the wavelength of the light source can be visible light, ultraviolet light or infrared light, including coherent light sources, such as 455 nm blue light, 532 nm green light, 808 nm red light, 1310 nm/1550 nm fiber laser or incoherent light sources like incandescent light bulbs. The aforementioned forms of the light source can all be applied to the terahertz modulator 100 of the present disclosure as long as the light source can be matched with the material properties of the terahertz modulator 100 and having a modulating effect with the terahertz modulator 100, the present disclosure is not limited thereto.

The terahertz modulator 100 can simultaneously have a high on-off contrast and be able to reach a high modulation speed. In detail, a range of a modulation speed of the terahertz modulator 100 is greater than 0 fps and less than or equal to $1 \times 10^{10}$ fps (frame per second). The on-off contrast can be represented by modulation depth. In detail, the definition of modulation depth of a terahertz modulator with a pulse wave light source is shown below as formula (I), and the definition of modulation depth of a terahertz modulator with a continuous wave light source is shown below as formula (II). A range of the modulation depth of the terahertz modulator 100 of the present disclosure with a continuous wave light source can be 15% to 20%. Further, a modulation depth of the terahertz modulator 100 of the present disclosure with a pulse wave light source can be higher academically, and the present disclosure is not limited thereto.

Formula (I): Modulation depth =
$$100\% - \left(\frac{\text{Peak to peak value of modulated wave}}{\text{Peak to peak value of carrier wave}}\right)^2;$$

Formula (II): Modulation depth =
$$100\% - \left(\frac{\text{Amplitude of electrical field of modulated wave}}{\text{Amplitude of electrical field of carrier wave}}\right)^2.$$

Figure 2:
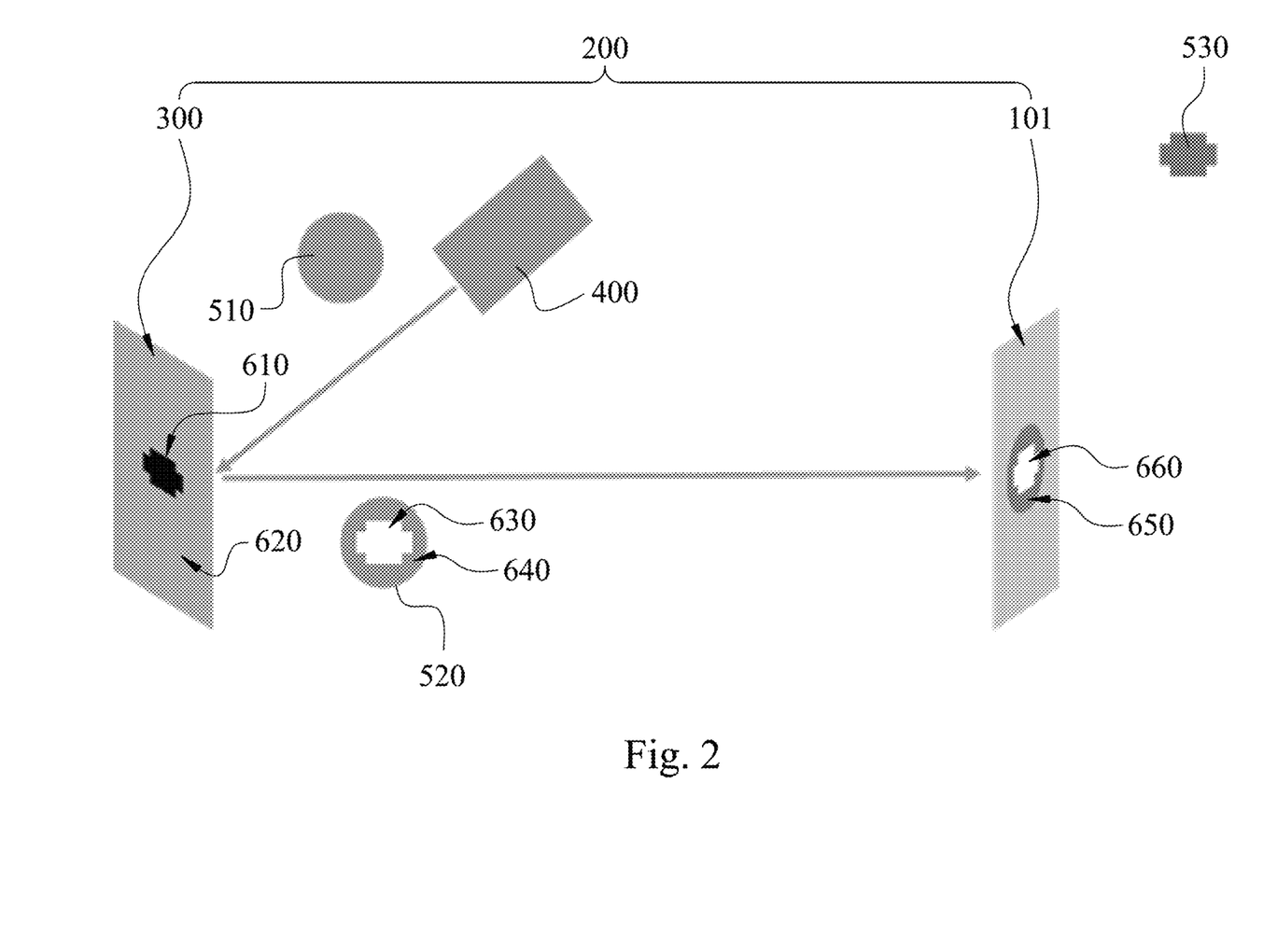
FIG. 2 is a framework and mechanism schematic view of a terahertz spatial light modulator according to another embodiment of the present disclosure.

Please refer to FIG. 2. FIG. 2 is a framework and mechanism schematic view of a terahertz spatial light modulator 200 according to another embodiment of the present disclosure. The terahertz spatial light modulator 200 includes a terahertz modulator 101 and an automatic pumped light spatial modulator 300. The automatic pumped light spatial modulator 300 is optically connected with the terahertz modulator 101. The terahertz spatial light modulator 200 generates a patterned terahertz light, and the terahertz spatial light modulator 200 has a high on-off contrast and is able to reach a high modulation speed. The technical detail of the terahertz modulator 101 in this embodiment is the same as the terahertz modulator 100 in the aforementioned embodiment, and the detail of the terahertz modulator 101 will not be described again herein.

In detail, the automatic pumped light spatial modulator 300 of the terahertz spatial light modulator 200, which is able to spatially modulate the visible light, infrared light or ultraviolet light, can be a digital micromirror device (DMD) or a liquid crystal spatial light modulator, etc. The liquid crystal spatial light modulator mentioned above represents all of the spatial light modulator based on liquid crystal-related technology such as liquid crystal reflective spatial light modulator and liquid crystal transmission spatial light modulator, but the present disclosure is not limited thereto.

Specifically, the automatic pumped light spatial modulator 300 in FIG. 2 is the digital micromirror device. The digital micromirror device is assembled from micrometer-scaled mirror arrays which are able to control reflective direction of an incident light individually, and the digital micromirror device has an ultra-high speed monitor refresh rate which can reach over thousands of frames, but the present disclosure is not limited thereto.

The terahertz spatial light modulator 200 of the present disclosure should apply with a light source 400 in practical use, wherein the light source 400 emits a pump light to irradiate the terahertz spatial light modulator 200 and so as to generate a spatial structure light. In detail, the form of the light source 400 can be continuous wave, pulse wave or arbitrary wave, and the wavelength of the light source 400 can be visible light, ultraviolet light or infrared light, including coherent light sources, such as 455 nm blue light, 532 nm green light, 808 nm red light, 1310 nm/1550 nm fiber laser or incoherent light sources like incandescent light bulbs. The aforementioned forms of the light source can all be applied to the terahertz spatial light modulator 200 of the present disclosure as long as the light source 400 can be matched with the material properties of the terahertz spatial light modulator 200 and having a modulating effect with the terahertz spatial light modulator 200, the present disclosure is not limited thereto.

Specifically, the light source 400 emits a pump light with a facula 510 to irradiate an area 610 and an area 620 of the automatic pumped light spatial modulator 300. The area 610 of the automatic pumped light spatial modulator 300 does not occur light reflection since the mirror arrays are deflected in the area 610; the area 620 of the automatic pumped light spatial modulator 300 occurs light reflection since the mirror arrays are not deflected in the area 620, and thus forms a facula 520. An area 630 of the facula 520 and an area 640 are the results generated by the pump light irradiating to the area 610 of the automatic pumped light spatial modulator 300 and the area 620 of the automatic pumped light spatial modulator 300, respectively.

After the pump light is reflected by the automatic pumped light spatial modulator 300 and is modulated to a spatial structure light, it is absorbed by the terahertz modulator 101 of the terahertz spatial light modulator 200, which is shown as an area 650 and an area 660. The area 650 is irradiated by the spatial structure light and generates photon carriers so as to have the effect of modulating a terahertz light. On the other hand, the area 660 is not irradiated by the spatial structure light and does not generate photon carriers, therefore the area 660 is not able to modulating a terahertz light. Finally, a patterned terahertz light modulated by the terahertz spatial light modulator 200 is shown as a facula 530.

An Example of the terahertz modulator of the present disclosure will be compared to a conventional GaAs terahertz modulator in the following paragraph. The terahertz modulator of this example is prepared by steps as follow. After doping phosphorus into commercial graphitic carbon nitride and forms the heterojunction material with PFTBTA by the aforementioned method, a raw material of the organic semiconductor is obtained. Mixing 5 mg of the raw material of the organic semiconductor with 0.1 mL of a binder to form a mixture, and the mixture is ultrasonicated for 30 minutes in 0.5 mL of methanol and forms a suspension. Finally, 0.1 mL of the suspension is dropped on a microscope slide substrate which area is 1 $cm^2$, and the solvent is evaporated by a heating plate in 70° C. to obtain the terahertz modulator of the present disclosure.

Figure 3:
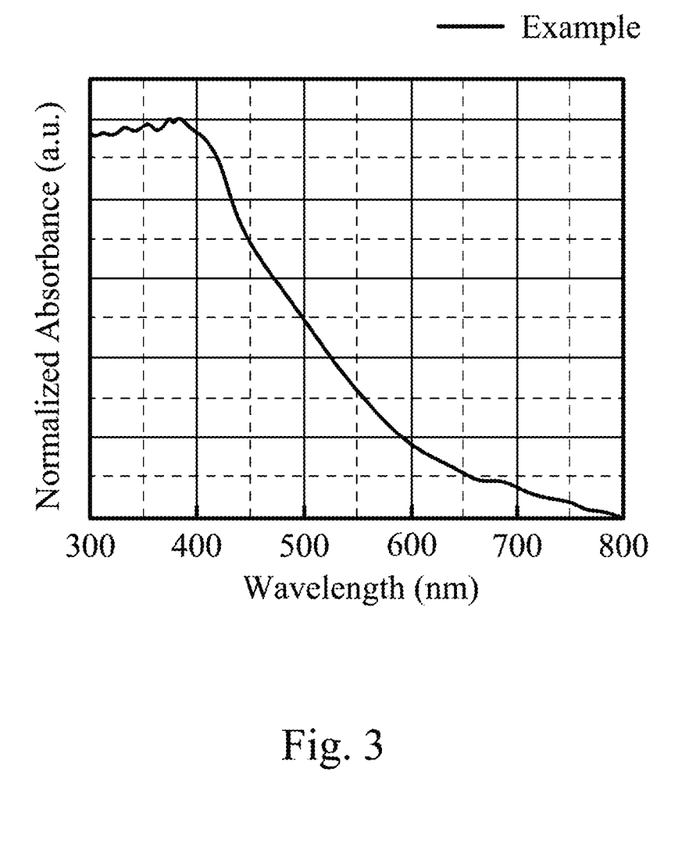
FIG. 3 is an absorption spectrum of the terahertz modulator according to one example of one embodiment of the present disclosure.

Please refer to FIG. 3. FIG. 3 is an absorption spectrum of the terahertz modulator according to one example of one embodiment of the present disclosure. According to FIG. 3, the terahertz modulator of this example has a higher absorbance to light with wavelength between 300 nm to 420 nm. In this example, the light source applied is a continuous wave laser with wavelength at 405 nm, which corresponds to the absorption band of the terahertz modulator of the present disclosure.

Figure 4:
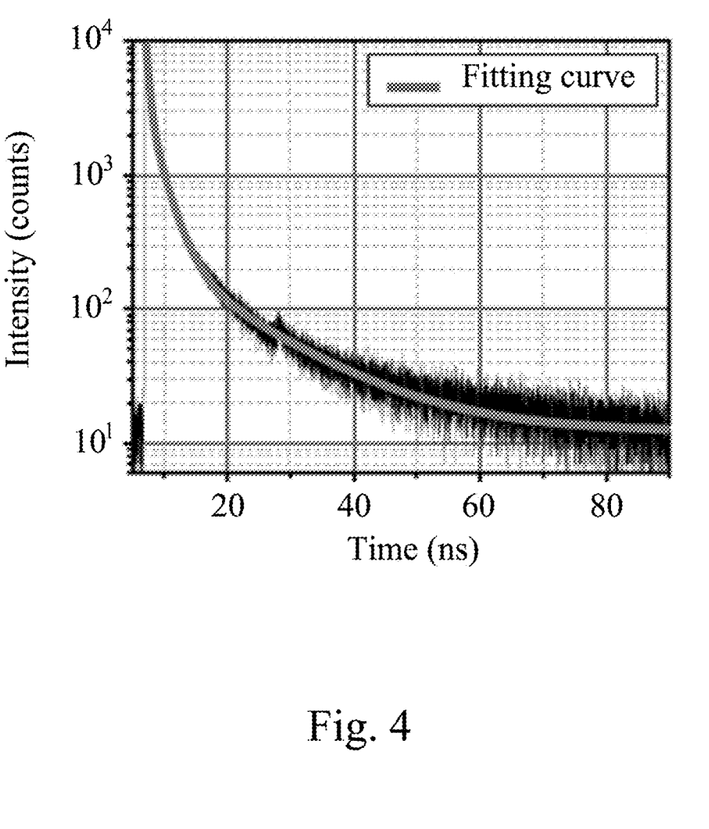
FIG. 4 is an intensity-time diagram of photoelectrons of the terahertz modulator according to one example of one embodiment of the present disclosure.

Please refer to FIG. 4. FIG. 4 is an intensity-time diagram of photoelectrons of the terahertz modulator according to one example of one embodiment of the present disclosure. In detail, according to FIG. 4, the average lifetime of photon carriers generated by irradiating the terahertz modulator of this example by the light source is 4.527 nanoseconds, the average lifetime of photon carriers can be further calculated to obtain the modulation speed, which is 221 MHz. That is, the range of the modulation speed of the terahertz modulator is greater than 0 fps and less than or equal to $2.21 \times 10^8$ fps. The result indicates that the order of the average lifetime of photon carriers generated by the terahertz modulator of this example is the same as the order of the average lifetime of photon carriers generated by the conventional GaAs terahertz modulator. In detail, in other examples, the average lifetime of photon carriers generated by the terahertz modulator of the present disclosure can be controlled in a range of 1 microsecond to 0.1 nanosecond, which means the range of the modulation speed can be greater than 0 fps and less than or equal to $1 \times 10^{10}$ fps, but the present disclosure is not limited thereto.

Figure 5:
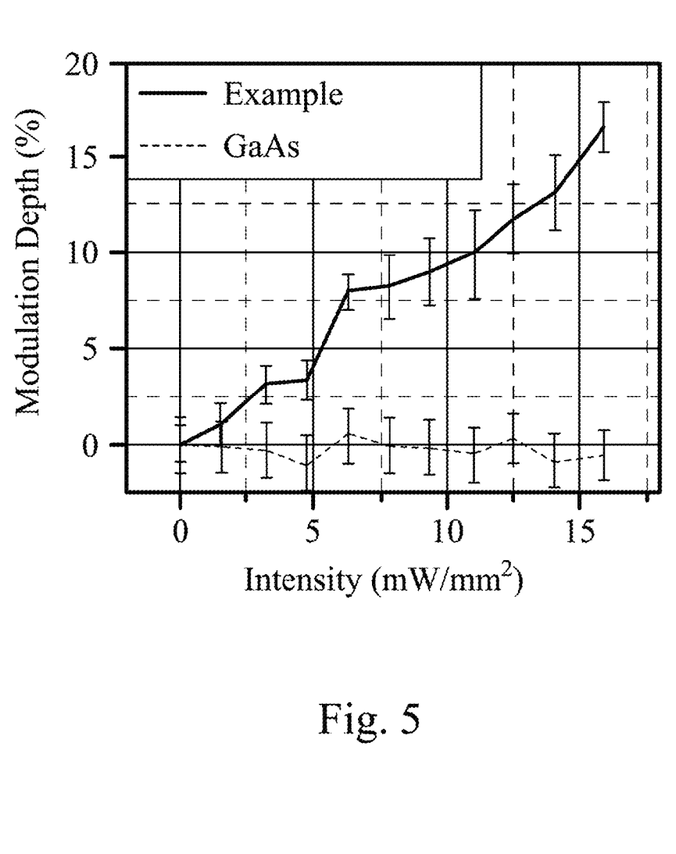
FIG. 5 is a modulation depth comparison diagram between the terahertz modulator according to one example of one embodiment of the present disclosure and conventional GaAs terahertz modulator.

Please refer to FIG. 5. FIG. 5 is a modulation depth comparison diagram between the terahertz modulator according to one example of one embodiment of the present disclosure and conventional GaAs terahertz modulator. According to FIG. 5, the modulation depth of the terahertz modulator of the present disclosure is more than 10 times of the modulation depth of the conventional GaAs terahertz modulator. It is presumed that the terahertz modulator of the present disclosure has a higher photoelectron generating efficiency to lead to this result. In this example, the terahertz modulator of the present disclosure irradiated by continuous wave light source can reach 16.5% in modulation depth. The pulse wave light source can also be chosen as the source of the pump light in practical, and the value of modulation depth of the terahertz modulator of the present disclosure irradiated by the pump light emitted by the pulse wave light source can be further enhanced. Therefore, the terahertz modulator of the present disclosure has a better performance than the conventional GaAs terahertz modulator.

Figure 6:
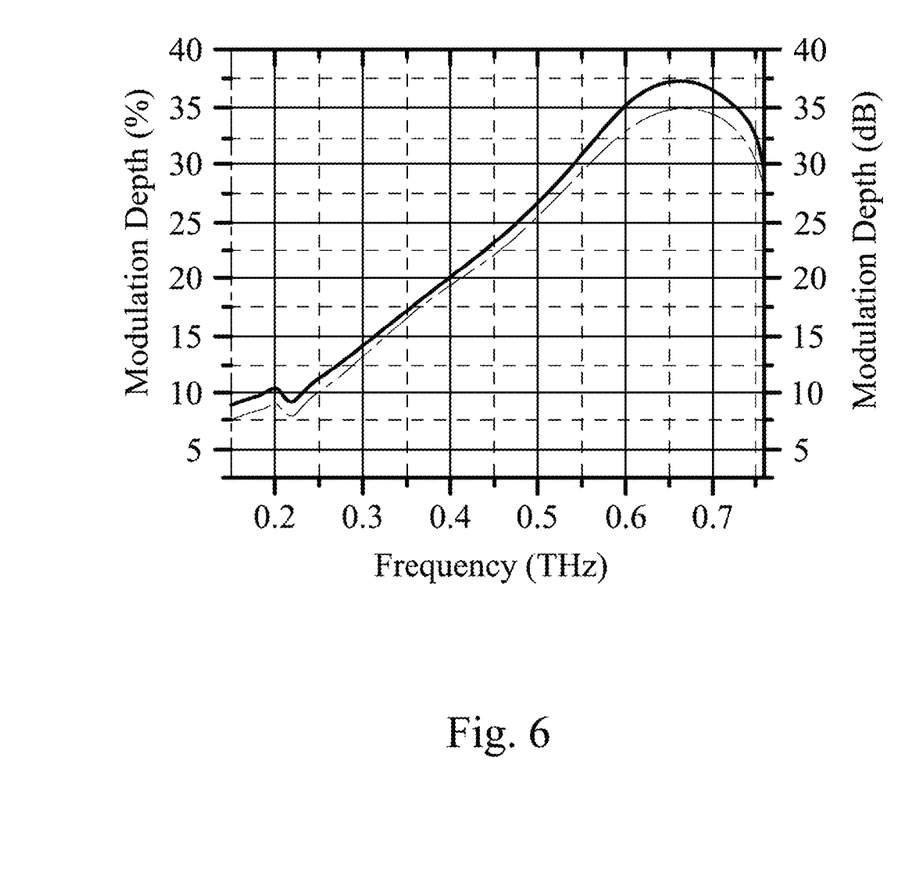
FIG. 6 is a modulation depth-terahertz frequency diagram of the terahertz modulator according to one example of one embodiment of the present disclosure.

Please refer to FIG. 6. FIG. 6 is a modulation depth-terahertz frequency diagram of the terahertz modulator according to one example of one embodiment of the present disclosure. As shown in FIG. 6, the terahertz modulator of the present disclosure has a modulation window ranging from 0.25 THz to 0.75 THz, and having over 10% of modulation rate.

In summary, by the organic semiconductor layer made of graphitic carbon nitride, the terahertz modulator and the terahertz spatial light modulator of the present disclosure have a better performance than the conventional GaAs terahertz modulator, and can reach the goal of having high on-off contrast and high modulation speed simultaneously.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A terahertz modulator, comprising:
a substrate; and
an organic semiconductor layer, wherein a material of the organic semiconductor layer is graphitic carbon nitride, and the organic semiconductor layer is coated on a surface of the substrate;
wherein the terahertz modulator has a high on-off contrast and is able to reach high modulation speed.

2. The terahertz modulator of claim 1, wherein the organic semiconductor layer further comprise a doping element, the doping element is a boron, a phosphorus, a nitrogen or an oxygen.

3. The terahertz modulator of claim 1, wherein the organic semiconductor layer is made of a heterojunction material.

4. The terahertz modulator of claim 3, wherein the heterojunction material is made from mixing a conjugated polymer with graphitic carbon nitride.

5. The terahertz modulator of claim 4, wherein the conjugated polymer is poly[4-(5-(9,9-dioctyl-9H-fluoren-2-yl)thiophen-2-yl)-5,6-difluoro-2-octyl-7-(thio phen-2-yl)-2H-benzo[d][1,2,3]triazole].

6. The terahertz modulator of claim 1, wherein a range of a modulation speed of the terahertz modulator is greater than 0 fps and less than or equal to $1 \times 10^{10}$ fps.

7. The terahertz modulator of claim 1, wherein the terahertz modulator is modulating with a light source.

8. The terahertz modulator of claim 1, wherein the substrate is made of a flexible material.

9. A terahertz spatial light modulator, comprising:
a terahertz modulator of claim 1; and
an automatic pumped light spatial modulator optically connected with the terahertz modulator;
wherein the terahertz spatial light modulator generates a patterned terahertz light, and the terahertz spatial light modulator has a high on-off contrast and is able to reach a high modulation speed.

10. The terahertz spatial light modulator of claim 9, wherein the automatic pumped light spatial modulator is a digital micromirror device or a liquid crystal spatial light modulator.

* * * * *